3,397,053
METHOD OF KILLING PLANTS
Carl Bordenca, Ponte Vedra Beach, and John M. Derfer, Jacksonville, Fla., assignors, by mesne assignments, to SCM Corporation, New York, N.Y., a corporation of New York
No Drawing. Filed Aug. 11, 1965, Ser. No. 478,985
16 Claims. (Cl. 71—98)

ABSTRACT OF THE DISCLOSURE

A method for controlling plant growth has been discovered and is described. The method comprises contacting plants with a phytotoxic amount of a β-dialkylaminoalkyl terpene ether of the formula

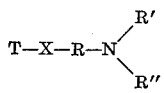

where T is a monoterpene hydrocarbon radical, X is selected from the group consisting of sulfur and oxygen, R is a lower alkylene group, and R' and R" are like or dissimilar alkyl groups.

The invention is advantageous in that undesirable plants are injured, damaged, or often killed when contacted with the class of compounds falling within the scope of the above formula. The invention is further advantageous in that the phytotoxic compounds and compositions containing them are relatively nontoxic to higher animals and man and are not hazardous skin irritants.

---

The present invention relates to a novel class of phytotoxic compositions and to a process for controlling plant growth. Preparations capable of killing plants and/or controlling their growth are valuable in protecting public utility lines, railroads and highway systems from overgrowth by plants and weeds.

It has presently been found that certain hereinafter defined β-dialkylaminoalkyl ethers of terpene alcohols which comprise the active compounds of the compositions of this invention are phytotoxic and are efficient phytocides.

The term "ether" as used herein is intended to mean and to refer to β-dialkylaminoalkyl ethers of terpene alcohols and their corresponding thioether analogs.

The present invention provides a phytotoxic composition comprising the β-dialkylaminoalkyl terpene ether and a carrier therefor, the ether being a compound of the formula

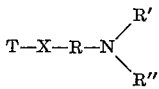   I.

where T is a monoterpene hydrocarbon radical, X is selected from the group consisting of sulfur and oxygen, R is a lower alkylene group, and R' and R" are like or dissimilar lower alkyl groups. These ethers and compositions containing them, when used to contact undesirable plants, result in injury and damage to, and often in the death of, the plants contacted.

The terpene ethers of the phytotoxic compositions of this invention are relatively nontoxic to higher animals and man and have been fed to warm-blooded animals in amounts above those amounts which are phytotoxic without significant adverse effects. These ethers have also been applied in phytotoxically active quantities to the skin of human beings and laboratory animals (e.g., albino rabbits) without significantly harmful effects. Standard evaluation tests have shown that these terpene ethers are not hazardous skin irritants.

In addition to phytotoxic activity these terpene ethers also have insectiphobic properties, as will be apparent from our copending application Ser. No. 479,009, filed simultaneously with the present application, and now abandoned.

In Formula I, R is a lower alkylene group and R' and R" are like or dissimilar lower alkyl groups containing from 1 to 8, preferably from 1 to 4, carbon atoms. Terpene ethers containing an alkylene or alkyl groups having 5 to 8 carbon atoms often tend to be insoluble or have a disadvantageously low solubility in organic liquids. Examples of advantageous dialkylaminoalkyl terpene ethers are those in which the lower alkyl groups are methyl, ethyl, propyl, isopropyl, n-butyl, t-butyl or sec-butyl groups. Preferably R is a methylene or an ethylene group and R' and R" are like lower alkyl groups, most preferably methyl and ethyl groups. Ethers wherein R is ethylene and R' and R" are like and are either methyl or ethyl are particularly preferred since such ethers have been found to possess a high degree of phytotoxic and/or phytocidal activity.

In Formula I, T represents a terpene hydrocarbon radical, advantageously a monoterpene hydrocarbon radical, formed by the reaction of a terpene alcohol or a mercaptan thereof and a chlorotertiary-alkylamine.

T can represent a variety of monoterpene hydrocarbon radicals, including acyclic, cyclic and bicyclic terpene hydrocarbon radicals. Acyclic terpene radicals represented by T and falling within the scope of Formula I include, for example, citronellyl, bupleuryl, geranyl, neryl, lavandulyl, linalyl and myrcenyl radicals. Examples of monocyclic terpene radicals include menthyl, tetrahydrocarvyl, terpinyls (e.g., alpha, beta and gamma terpinyls), terpinenyls, dihydrocarvyl, piperityl, isopulegyl, carvyl, etc. radicals. Examples of bicyclic monoterpene radicals include nopyl, sabinyl, thujyl, pinocamphyl, myrtenyl, verbenyl, pinocarvyl, the santenyls, bornyl, isobornyl, fenchyl and isofenchyl radicals.

It has presently been found that β-dialkylaminoalkyl ethers which have a higher degree of phytotoxic properties are those wherein T (in Formula I) is a monoterpene hydrocarbon radical containing an allylic group or linkage within its structure. Such an allylic monoterpene hydrocarbon radical can be acyclic or cyclic in structure. Desirable allylic acyclic monoterpene hydrocarbon radicals include, for example, geranyl and linalyl radicals; allylic cyclic monoterpene hydrocarbon radicals include monocyclic verbenyl and carvyl radicals and the bicyclic pinocarvyl radical.

It is to be understood, however, that compounds wherein T is a monoterpene hydrocarbon radical which does not possess an allylic group or linkage within its structure (e.g., isopulegyl and nopyl radicals) are often useful as phytotoxic agents and the compositions and processes of this invention are not to be construed as being solely limited to allylic terpene ethers.

As noted above, X in Formula I may be sulfur or oxygen. Compounds falling within the scope of this formula are β-dialkylaminoalkyl ethers of terpene alcohols and the corresponding thioether analogs thereof.

The terpene ethers of the compositions of this invention generally are water insoluble and all are soluble at least to some extent in the usual organic solvents. They are liquid and have the general appearance and properties of oils. Various ethers boil between 100 and 170° C. when the boiling points are measured at a pressure of 1 mm. of mercury.

Preferred phytotoxic compositions are those comprising a β-diethylaminoethyl ether of a terpene alcohol and a carrier therefor in which the ether is a compound of the formula $$T-X-\underset{\underset{H}{|}}{\overset{\overset{H}{|}}{C}}-\underset{\underset{H}{|}}{\overset{\overset{H}{|}}{C}}-N\diagup\diagdown\begin{array}{l}C_2H_5\\C_2H_5\end{array} \quad \text{II.}$$

where T is a hereinbefore described allylic monoterpene hydrocarbon radical and X is oxygen or sulfur. Such compounds exhibit the highest degree of phytotoxicity within the class of compounds herein described. Particularly preferred compounds are those in which (in Formula II above) T is geranyl, linalyl, verbenyl, carvyl or pinocarvyl and X is sulfur or oxygen.

The amount of β-dialkylaminoalkyl terpene ethers employed in the compositions herein described can vary widely from within about 0.01% to about 90% by weight, based on the weight of the composition, the particular amount of terpene ether depending upon the end use intended.

Usually the compositions will contain from about 0.01 to about 10% by weight of terpene ether intimately mixed with a carrier. When it is desired to use a composition directly; that is, without dilution, the amount of terpene ether will usually vary from about 0.01 to about 1% by weight, depending upon the size of the plant or shrub against which it is to be used. When it is intended to formulate a concentrated composition; that is, one suitable for end-use dilution, the ether will usually be present in the composition in an amount of from about 1% to 90% by weight. From a practical standpoint, compositions containing from about 1% to about 10% by weight of terpene ether can be advantageously employed for general end-use dilution.

The carrier or diluent may be any carrier conventionally employed in phytocidal or phytotoxic formulations. The carrier should be inert; that is, it should be incapable of undergoing a chemical reaction with the terpene ether.

The carrier may be any one of a variety of organic and inorganic liquid, solid or semi-solid carriers or carrier formulations conventionally used in phytocidal or phytotoxic formulations and can be a mixture of such carriers.

Examples of liquid organic carriers include liquid, aliphatic hydrocarbons such as pentane, hexane, heptane, nonane, decane and their analogs as well as liquid aromatic hydrocarbons (e.g., xylene). Other liquid hydrocarbons include oils produced by the distillation of coal and the distillation of various types and grades of petroleum stocks.

Petroleum oils which are especially desirable include kerosene oils, e.g., oils composed of hydrocarbon mixtures of low molecular weight (e.g., 10 to 16 carbon atoms) which are obtained by fractional distillation between 360° F. and 510° F. and which usually have a flash point between 150° F. and 185° F. Other petroleum oils include those generally referred to as agricultural spray oils and are light and medium oils which consist of the middle fractions of the distillation of petroleum, having a viscosity in the range of from 40 to 85 sec. Saybolt at 100° F., and are only slightly volatile. These oils are usually highly refined and contain only minute amounts of unsaturated compounds as measured by standard sulfonation tests. The customary sulfonation range of such oils is between 90% and 94% unsulfonatable residue. Such paraffin type oils are advantageous in that they can be emulsified with water and used in controlled concentrations in sprays. Tall oils obtained from the sulfate digestion of wood pulp may also be employed.

In addition to the above-mentioned liquid hydrocarbons and usually used in conjunction therewith, the carrier can contain a conventional emulsifying agent, e.g., an ethylene oxide condensate of an alkyl phenol or an anionic surfactant such as an alkali metal salt of an alkyl benzene sulfonic acid. Such emulsifiers are added and used to enable the compositions to be diluted with water for end-use applications. Usually when paraffin oils are employed an emulsifier is included and the mixture (e.g., terpene ether, paraffin oil, emulsifier) is diluted with water just prior to end-use application. For example, when a terpene ether is dissolved in a paraffin oil containing an emulsifier and such compositions are diluted with water to form an oil-in-water emulsion, the emulsions when atomized and sprayed on undesirable plants will usually damage the plant to the point where further growth is prevented or will kill the plant. Other advantageous organic liquid carriers include liquid terpene hydrocarbons and alcohols such as alpha-pinene, dipentene, terpineol and the like. Still other liquid carriers include organic solvents such as aliphatic and aromatic alcohols, aldehydes and ketones. Suitable aliphatic monohydroxy alcohols include, for example, methyl, ethyl, n-propyl, isopropyl, n-butyl, t-butyl, sec-butyl, etc. alcohols; suitable dihydroxy alcohols include gylcols such as ethylene and propylene glycol and the pinacols, for example, alcohols having the formula $C_6H_{12}(OH)_2$. Suitable polyhydroxy alcohols include glycerol, sorbitol, erythritol, arabitol and the like. Suitable cyclic alcohols include, for example, cyclopentanyl and cyclohexyl alcohols.

Aromatic and aliphatic esters, aldehydes and ketones are often used in combination with the above-mentioned alcohols. Still other liquid carriers include higher boiling petroleum products such as mineral oil, and higher molecular weight alcohols such as cetyl alcohol (sometimes referred to as "liquid waxes") may also be employed.

Solid carriers which may be employed in the compositions of this invention include finely-divided organic and inorganic solid materials. Examples of finely divided solid inorganic carriers include siliceous minerals such as clays; for example, Bentonite, Attapulgite, Fullers earth, diatomaceous earth, kaolin, mica, talc and finely divided quartz, etc., as well as synthetically prepared siliceous materials such as precipitated and fume silicas and silica aerogels.

Examples of finely divided solid organic materials include starch, flour, sugar, powdered sawdust, casein, gelatin and the like. Examples of semisolid organic carriers include petroleum jelly, lanolin and the like and mixtures of these with any of the above-defined solid and liquid carriers, and emulsifiers when desired. The above-described compositions can be employed per se, can be diluted with suitable liquids, or can be applied to the plants in the form of a dust and will effectively cause injury resulting in lack of growth or death to the plant.

The present invention also provides the method of contacting plants with a phytotoxic amount of a β-dialkylaminoakyl terpene ether falling within the scope of Formula I and/or Formula II hereinbefore described to damage or kill undesirable plants. Contact of the plant may be effected by conventional means, for example with liquid compositions in the form of aerosolized liquid sprays or with solid compositions in the form of dusts. The terpene ethers are highly active phytotoxically in formulations which have ether concentrations as low as 0.01% by weight.

The amount of terpene ether employed to contact plants in accordance with the processes of this invention can vary widely and will depend to some extent upon the size and age of the plant. By way of example and as will be evident from the specific examples, young plants are more readily killed by smaller amounts of terpene ethers whereas larger and mature plants require greater amounts of terpene ethers. For example, formulations containing as little as 0.01% by weight of terpene ether will often kill or injure young plants and seedlings. On the other hand, formulations containing from about 0.25 to about 5% by weight of terpene ethers, when conventionally used, are usually sufficient to control the growth of or to destroy mature and larger plants.

The terpene ethers comprising the active components of the compositions herein described are prepared by methods conventional in the organic synthetic art and are described in our copending application Ser. No. 479,009, filed simultaneously with the instant application, and now abandoned.

The following specific examples are intended to illustrate the invention but not to limit the scope thereof, parts and percentages being by weight unless otherwise specified.

EXAMPLE 1

Seven separate dispersions consisting of 0.35% by weight, respectively, of menthyl, isopulegyl, nopyl, geranyl, carvyl, verbenyl and linalyl β-dimethylaminoethyl ethers, 1% by weight of Triton X–100 (e.g., para-iso-octyl polyethoxyethylene phenol), 5% by weight of acetone, and the balance consisting substantially of water, were prepared. Seven groups of four Mexican bean plants, four garden pea plants, and four lima bean plants (infested with insects) were contacted with 5 milliliters, respectively, of one of the seven above-described dispersions. The contact was effected by spraying the plants from a distance of one foot using a conventional spraying device. The total quantity of ether sprayed on each plant was 17.5 milligrams. Replicate plants were untreated and used as controls. The plants treated with the menthyl ether, the isopulegyl ether, the verbenyl ether and the linalyl ether were phytotoxic to the plants to which they were contacted, as evidenced by leaf curling, mottled appearance of the leaves and local leaf necrosis within 5 days. The plants treated with the popyl geranyl and caryl ethers were killed, demonstrating the phytocidal effect of these terpene ethers on the plants. The untreated plants which served as controls were unaffected and continued growing.

When dispersions containing the corresponding diethylaminoethyl ethers of menthol, isopulegol, geraniol, carveol, verbenol and linalool are used on fresh plants in place of the dispersions employed in Example 1, substantially the same results are obtained. When dispersions containing dimethylaminoethyl thioethers of menthol, isopulegol, geraniol, carveol, verbenol and linalool are substituted for the ethers employed in Example 1 and the same kind of fresh plants are treated therewith, the results are substantially the same except that the geranyl thioether kills the series of plants instead of damaging them (see Example 4).

EXAMPLE 2

A dispersion consisting substantially of 0.35% by weight of the β-dimethylaminoethyl ether of pinocarveol, 1% by weight of Triton X–100, 20% acetone, and water was prepared. Separate 2 milliliter quantities of this dispersion were applied to each of 4 Mexican bean plants, 4 garden pea plants, and 4 lima bean plants. About 6 milligrams of pinocarvyl ether was used to contact each plant. Within 5 days substantially all of the plants were dead.

Substantially the same results are obtained when a dispersion containing 0.5% of the diethylaminoethyl ether of pinocarveol is substituted for the pinocarvyl ether employed in Example 2.

EXAMPLE 3

Three separate dispersions containing 0.1% by weight of the diethylaminoethyl ether of nopol, 0.1% by weight of the diethylaminoethyl ether of geraniol, and 0.05% by weight of the diethylaminoethyl ether of geraniol, were prepared. Separate 5 milliliter amounts of these ethers were applied to each of 4 separate groups of 4 Mexican bean plants, pea plants and lima bean plants. Two days after the contact of the planes with the terpene ethers the leaves of the bean plants, pea plants and the lima bean plants were withered although the plants were not dead. Replicate groups of plants which served as controls had grown significantly during this period, although the treated plants had ceased to grow.

EXAMPLE 4

Three separate dispersions containing, respectively 0.35%, 0.1% and 0.05% by weight of the β-diethylaminoethyl thioether of geraniol were prepared. Each dispersion was used to contact separate groups consisting of 4 Mexican bean plants, 4 pea plants and 4 lima bean plants. The plants treated with the dispersions containing 0.35% and 0.1% of the ethers were dead within 3 days. Half of the plants treated with the 0.05% dispersion died within 5 days. The remainder of the plants, while living, did not reach the growth attained by replicate untreated controls within the test period.

What is claimed is:

1. The method of contacting plants with a phytotoxic amount of a β-dialkylaminoalkyl terpene of the formula

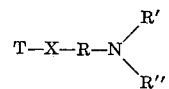

where T is a monoterpene hydrocarbon radical selected from the group consisting of menthyl, isopulegyl, nopyl, geranyl, carvyl, verbenyl, linalyl, and pinocarvyl; X is sulfur or oxygen; R is a lower alkylene group; and R' and R'' are like or dissimilar alkyl groups.

2. The process as in claim 1 wherein said ether is in combination with a carrier.

3. The method of claim 1 wherein in said formula, R is ethylene and R' and R'' are like lower alkyl.

4. The process of claim 1 wherein in said formula, R' and R'' are methyl.

5. The process of claim 1 wherein in said formula, X is oxygen.

6. The process of claim 5 wherein in said formula, T is geranyl.

7. The process of claim 5 wherein in said formula, T is linalyl.

8. The process of claim 5 wherein in said formula, T is verbanyl.

9. The process of claim 5 wherein in said formula, T is carvyl.

10. The process of claim 5 wherein in said formula, T is pinocarvyl.

11. The process of claim 1 wherein in said formula, X is sulfur.

12. The process of claim 11 wherein in said formula, T is geranyl.

13. The process of claim 11 wherein in said formula, T is linalyl.

14. The process of claim 11 wherein in said formula, T is verbenyl.

15. The process of claim 11 wherein in said formula, T is carvyl.

16. The process of claim 11 wherein in said formula, T is pinocarvyl.

References Cited

UNITED STATES PATENTS

| | | | |
|---|---|---|---|
| 2,316,625 | 4/1943 | Rothenberger | 260—570.5 |
| 2,868,634 | 1/1959 | Krewson et al. | 71—2.6 |
| 3,032,406 | 5/1962 | D'Amico et al. | 71—2.3 |
| 3,142,554 | 7/1964 | Godfrey | 71—2.3 |

FOREIGN PATENTS 1,126,383  3/1962  Germany.

OTHER REFERENCES

Muller et al.: Chemical Abstracts, vol. 61, col. 9770(c) (1964).

JAMES O. THOMAS, JR., *Primary Examiner.*